US012752762B2

(12) United States Patent
Geis-Esser et al.

(10) Patent No.: US 12,752,762 B2
(45) Date of Patent: Oct. 6, 2026

(54) REDUNDANT ELECTROMECHANICAL BRAKING SYSTEM AND ACTUATOR THEREFOR

(71) Applicant: KNORR-BREMSE Systeme fuer Nutzfahrzeuge GmbH, Munich (DE)

(72) Inventors: Daniel Geis-Esser, Munich (DE); Martin Mederer, Neumarkt (DE); Tobias Schoefberger, Mainburg (DE); Robert Theil, Tuerkenfeld (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 360 days.

(21) Appl. No.: 18/292,995

(22) PCT Filed: Jul. 18, 2022

(86) PCT No.: PCT/EP2022/070068

§ 371 (c)(1), (2) Date: Jan. 29, 2024

(87) PCT Pub. No.: WO2023/006477

PCT Pub. Date: Feb. 2, 2023

(65) Prior Publication Data

US 2025/0074380 A1 Mar. 6, 2025

(30) Foreign Application Priority Data

Jul. 30, 2021 (DE) ..................... 10 2021 119 939.5

(51) Int. Cl.
*B60T 13/74* (2006.01)
*B60L 7/24* (2006.01)
*B60T 8/17* (2006.01)

(52) U.S. Cl.
CPC .............. *B60T 13/746* (2013.01); *B60L 7/24* (2013.01); *B60T 8/17* (2013.01);
(Continued)

(58) Field of Classification Search
None
See application file for complete search history.

(56) References Cited

U.S. PATENT DOCUMENTS

2002/0050739 A1 5/2002 Koepff et al.
2007/0152499 A1* 7/2007 Tonoli .................. B60T 13/741 303/20

(Continued)

FOREIGN PATENT DOCUMENTS

CN 103167976 A 6/2013
DE 100 36 287 A1 2/2002

(Continued)

OTHER PUBLICATIONS

DE10036287A1: English Machine Translation (Year: 2002).*

(Continued)

*Primary Examiner* — Melanie Torres Williams
(74) *Attorney, Agent, or Firm* — Crowell & Moring LLP

(57) ABSTRACT

An electromechanical braking system for a vehicle, having at least one first actuator, at least one first and one second energy supply device, wherein one of the energy supply devices is assigned to the first actuator as a primary source for supplying it with electrical energy, and the first actuator has a connection to this primary source. The first actuator additionally has a connection to an energy supply device which is assigned to said actuator as a secondary source and is intended to supply the first actuator with electrical energy from the primary source. An actuator having a primary and a secondary energy absorption device, each for connection to an energy supply device. Vehicle, trailer or utility vehicle combination having such a braking system and/or such an actuator.

18 Claims, 2 Drawing Sheets

(52) U.S. Cl.
CPC ... *B60T 2270/402* (2013.01); *B60T 2270/413* (2013.01); *B60T 2270/414* (2013.01)

(56) References Cited

U.S. PATENT DOCUMENTS

| | | | |
|---|---|---|---|
| 2008/0135357 | A1 | 6/2008 | Lang |
| 2010/0243388 | A1 | 9/2010 | Holzwarth |
| 2013/0282249 | A1 | 10/2013 | Heise et al. |
| 2017/0072920 | A1 | 3/2017 | Besier et al. |
| 2019/0308596 | A1 | 10/2019 | Besier et al. |
| 2020/0324744 | A1 | 10/2020 | Mizusaki et al. |

FOREIGN PATENT DOCUMENTS

| | | | | | |
|---|---|---|---|---|---|
| DE | 10 2006 010 713 | A1 | | 9/2007 | |
| DE | 10 2007 021 286 | A1 | | 11/2008 | |
| DE | 10 2009 030 817 | A1 | | 11/2010 | |
| DE | 10 2009 046 238 | A1 | | 5/2011 | |
| DE | 10 2011 084 534 | A1 | | 4/2012 | |
| DE | 10 2018 216 669 | A1 | | 4/2020 | |
| DE | 11 2018 006 055 | T5 | | 8/2020 | |
| EP | 1 557 317 | A1 | | 7/2005 | |
| EP | 1 584 532 | A1 | | 10/2005 | |
| EP | 3 623 242 | A1 | | 3/2020 | |
| WO | WO 2006/058825 | A1 | | 6/2006 | |
| WO | WO 2015/173134 | A1 | | 11/2015 | |
| WO | WO 2016/000865 | A1 | | 1/2016 | |
| WO | WO-2020204509 | A1 | * | 10/2020 | ............ B60T 13/662 |

OTHER PUBLICATIONS

International Preliminary Report on Patentability (PCT/IB/326 & PCT/IB/373 issued in PCT Application No. PCT/EP2022/070068 dated Feb. 8, 2024, including English translation of Written Opinion (PCT/ISA/237) (8 pages).
International Search Report (PCT/ISA/210) issued in PCT Application No. PCT/EP2022/070068 dated Nov. 17, 2022 with English translation (8 pages).
German-language Written Opinion (PCT/ISA/237) issued in PCT Application No. PCT/EP2022/070068 dated Nov. 17, 2022 with English translation (8 pages).
Cover Page of EP 3 160 807 A0 published May 3, 2017 (one (1) page).
Cover Page of EP 3 142 905 A0 published Mar. 22, 2017 (one (1) page).
Chinese-language Office Action issued in Chinese Application No. 202280053240.0 dated Mar. 23, 2026 (10 pages).

* cited by examiner

REDUNDANT ELECTROMECHANICAL BRAKING SYSTEM AND ACTUATOR THEREFOR

BACKGROUND AND SUMMARY

The present invention relates to an electromechanical braking system for a vehicle, having at least one first actuator and at least one first energy supply device, wherein one of the energy supply devices is assigned to the first actuator as the primary source for supplying electrical energy and the first actuator has a connection to this energy supply device assigned as the primary source. In addition, the present invention relates to an actuator, in particular an electromechanical braking device for a vehicle, which has an energy absorption device for connection to an energy supply device. The invention also relates to a vehicle, a trailer and a combination of utility vehicles having such a braking system and/or such an actuator.

Vehicles with electromechanical braking systems, for example, have multiple electromechanical braking devices as actuators, each of which is supplied with energy for operation in groups by different energy supply devices. For example, the braking devices that are attached to a front axle of the vehicle are supplied with energy by a first energy supply device and the braking devices attached to a rear axle of the vehicle are supplied with energy by a second energy supply device.

If the power supply fails at one or more of the braking devices, for example due to a cable break in a distribution network of the assigned energy supply device, then this braking device can no longer be used for braking. As a result, the braking power of the braking system is reduced. In particular, if energy is only supplied to braking devices that are arranged on wheels on which the load is reduced by the braking process, this represents an increased safety risk, as the maximum transmittable braking force is significantly reduced and thus sufficient deceleration of the vehicle can no longer be guaranteed.

Against this background, the object of the present invention is to improve the operational safety of an electromechanical braking system, an actuator, a vehicle, a trailer and/or a combination of utility vehicles.

To achieve the object, an electromechanical braking system for a vehicle is provided which has at least one first actuator, at least one first energy supply device, and a second energy supply device, wherein the first actuator is assigned one of the energy supply devices as the primary source for supplying electrical energy and the first actuator has a connection to the energy supply device assigned to it as the primary source. The first actuator also has a connection to an energy supply device assigned to it as a secondary source for supplying the first actuator with electrical energy from the energy supply device assigned as the primary source.

Thus, the actuator is provided with two mutually independent energy supply devices for supplying the actuator with electrical energy. If one of the energy supply devices fails, the other supplies the actuator with energy. This means that the first actuator can also be used if it does not receive any energy from its primary source. This increases the operational safety of a vehicle equipped with such a braking system.

In another embodiment, the braking system has at least one second actuator to which one of the energy supply devices is assigned as the primary source for supplying electrical energy, wherein the second actuator is connected to this energy supply device assigned as the primary source and wherein the second actuator is additionally connected to an energy supply device assigned to it as a secondary source for supplying the actuator with electrical energy from the energy supply device assigned as the primary source.

Thus, two mutually independent energy supply devices are provided for each actuator. This improves operational safety by avoiding failures or at least mitigating their effects, in particular loss of braking power.

In another embodiment, at least one of the actuators is assigned one of the energy supply devices as a secondary source that is not assigned to it as a primary source.

For example, if the braking system has a first energy supply device and a second energy supply device, then the actuators can be divided into first and second actuators, for example, wherein the first actuators are assigned the first energy supply device as the primary source and the second actuators are assigned the second energy supply device as the primary source. The respective other energy supply device is then assigned to the actuators as a secondary source. As a result, additional redundancy of the energy supply for the actuators can be achieved with the existing energy supply devices.

In another embodiment, at least one of the actuators has a primary energy absorption device and a secondary energy absorption device, each for connection to an energy supply device.

This simplifies the connection to the energy supply devices. In particular, each of the energy absorption devices can be set up and/or designed for different characteristics of the energy supply device to be connected to it.

In another embodiment, at least one of the energy absorption devices has a signal input for receiving a control signal for controlling the actuator.

In certain cases, such as when using a CAN bus, signals for controlling the actuator can be transmitted together with the required energy via the same connection.

In another embodiment, the energy absorption device with the signal input is set up to receive power that is less than the power for which the other energy absorption device is set up to receive.

If appropriate, the power that can be transmitted via a connection, for example via a CAN bus, is limited. For example, the power consumption device with the signal input limits the current it can receive so as not to damage the connection and not to damage the energy supply device connected to it. This further increases operational safety.

In another embodiment, at least one of the actuators is assigned a recuperation device as a secondary source.

Where in the event of a failure the energy for the operation of the actuators which have a braking effect is also recuperated from the movement of the vehicle, an additional braking effect is achieved. Moreover, even if the first and second energy supply devices have failed, a braking effect can still be achieved.

In another embodiment, at least one of the actuators is assigned a third energy supply device as a secondary source.

As a result, even if the first and second energy supply devices have both failed, a braking effect can still be achieved.

In another embodiment, one of the connections between one of the actuators and the energy supply device assigned to it as a secondary supply device has a direct electrical connection.

This is the easiest way to connect multiple energy supply devices to one actuator.

In another embodiment, one of the connections between one of the actuators and the energy supply device assigned to it as a secondary source has a connection between a first distribution network connected to the primary source and a second distribution network connected to the secondary source.

A possible connection between the two energy supply devices via the distribution network may allow at least partial use of devices of the respective other energy supply device. For example, supply lines, control equipment, power limiting or similar in the energy supply may also be used by the other energy supply device.

In another embodiment, one of the connections between one of the actuators and the energy supply device assigned to it as a secondary source has a control device for controlling and/or regulating an energy flow between the secondary source and the actuator.

This makes it possible to take into account the performance limits of the energy supply device assigned as a secondary source. If, for example, the first and second energy supply devices are not designed in such a way that they can supply all actuators with energy completely, then in the event of a failure of one of the energy supply devices the amount of power taken from the remaining energy supply device to the actuators affected by the failure can be taken in such a way that the remaining energy supply device is not overloaded.

In another embodiment, the first actuators are arranged on a front axle of the vehicle, wherein the first actuators are assigned the first energy supply device as the primary source, and the second actuators are arranged on a rear axle of the vehicle, wherein the second actuators are assigned the second energy supply device as the primary source.

The fact that the actuators of each axle are very likely to fail or to only be operable with reduced power at the same time in this case means that asymmetrical braking power on an axle initiating a rotational movement of the vehicle is avoided.

In another embodiment, the braking system has a control device for controlling the energy consumption of the braking devices.

Such control devices and control units can, for example, regulate the braking force applied or avoid an overload of the energy supply devices. In addition, for example, the braking force effect of certain actuators, such as the actuators on the front axle, can be prioritized by means of such a control device. The flow of energy from a control cable, such as a CAN bus, can also be limited by such a control device. In the event of a limit, the maximum braking force is reduced, but still sufficient to ensure sufficient deceleration of the vehicle. Sufficient deceleration may be defined, for example, by a legal requirement and/or a standard.

Furthermore, the object is achieved by an actuator, in particular an electromechanical braking device for an electromechanical braking system consisting of a primary energy absorption device and a secondary energy absorption device, each for connection to an energy supply device and a controllable selection device for the selection of one of the energy supply devices for supplying the actuator with electrical energy.

This improves the operational safety and the fail-safe nature of the actuator.

In other embodiments, the selection device is set up to select energy from the energy supply device connected to the secondary energy absorption device for use by the actuator in the event of a malfunction of the energy supply device connected to the primary energy absorption device.

In the case of a redundant design with multiple energy supply devices, the actuator can thus automatically switch from the failed energy supply device to a still functioning energy supply device, thus increasing the fail-safe level.

The object is also achieved by a trailer containing one of the aforementioned electromechanical braking systems and/or one of the aforementioned actuators.

Such a vehicle has improved operational safety and failure safety since its braking system can still exert braking force even in the event of a failure of a primary source.

The object is also achieved by a trailer containing one of the aforementioned electromechanical braking systems and/or one of the aforementioned actuators.

Such a trailer has improved operational safety and failure safety since its braking system can still exert a braking force even in the event of a failure of a primary source.

The object is also achieved by a utility vehicle combination comprising one of the aforementioned vehicles and one of the aforementioned trailers.

Such a utility vehicle combination has improved operational safety and failure safety because its braking system can still exert braking force in the event of a failure of a primary source.

The invention is explained below in more detail based on exemplary embodiments, which are only schematically shown in the attached figures.

DETAILED DESCRIPTION OF THE DRAWINGS

Figure 1:
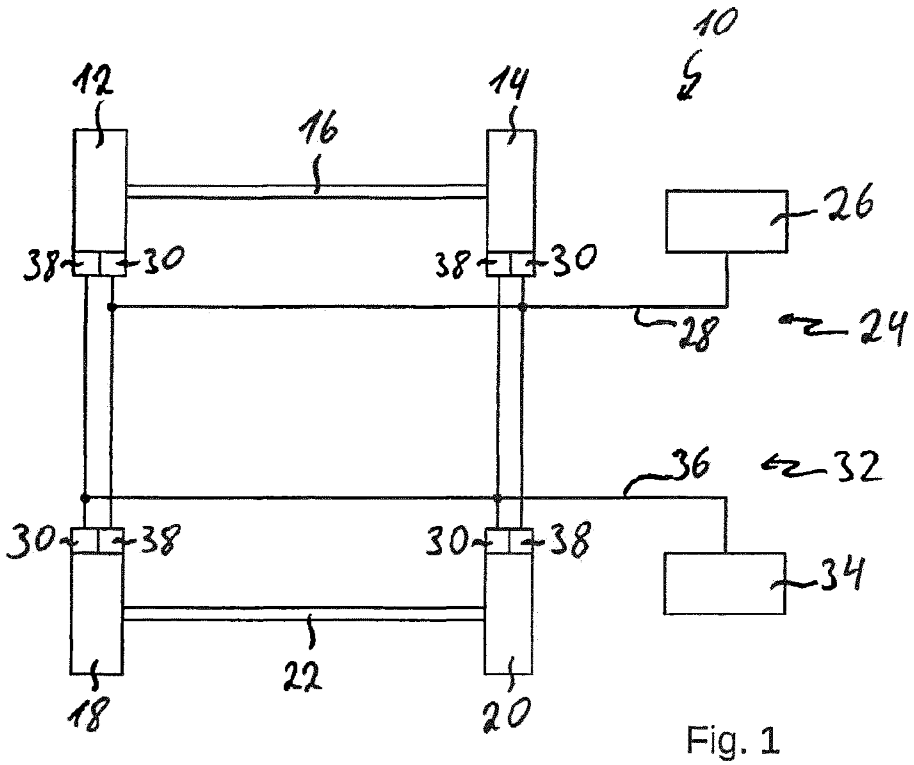
FIG. 1 is a schematic representation of a braking system according to an embodiment of the invention.

An electromechanical braking system 10, for a vehicle shown in FIG. 1, has two first actuators, such as first electromechanical braking devices 12, 14, which are arranged on a first axle 16 of the vehicle. In addition, the braking system 10 has two second actuators, in this case electromechanical braking devices 18, 20, which are arranged on a second axle 22 of the vehicle.

For example, the first axle 16 can be a front axle of the vehicle. For example, the second axle 22 can be a rear axle of the vehicle.

In order to supply the first braking devices 12, 14 with electrical energy, a first energy supply device 24 is provided, which has a first energy storage device 26. A first distribution network 28 is provided for the electrical connection of any equipment of the vehicle to each other and connects the first energy supply device 24 connected thereto with the first braking devices 12, 14. The first braking devices 12 and 14 each have a primary input 30 for connection to the first distribution network 28. In normal operation, the primary input 30 receives the energy required for the operation of the first braking devices 12, 14 from a primary source assigned to them, which is formed here by the first energy supply device 24.

For supplying the second braking devices 18 and 20 with electrical energy, a second energy supply device 32 is provided, which has a second energy storage device 34. Analogous to the first distribution network 28, a second distribution network 36 connects the second energy supply device 32 to primary inputs 30 of the second braking devices 18, 20. i.e. the second energy supply device 32 is assigned to the second braking devices 18, 20 as the primary source.

The braking devices 12, 14, 18, 20 each have a secondary input 38 for connection to an energy supply device 24, 32 assigned as a secondary source to each of the braking devices 12, 14, 18, 20.

Since there are only two energy supply devices 24, 32, the braking devices 12, 14, 18, 20 are each assigned one of the energy supply devices 24, 32 as the primary source and the other energy supply device 24, 32 as a secondary source. In the present embodiment, the first braking devices 12, 14 are assigned the first energy supply device 24 as the primary source and the second energy supply device 32 as the secondary source. The second braking devices 18, 20 are assigned the second energy supply device 32 as the primary source and the first energy supply device 24 as the secondary source.

The secondary inputs 38 are therefore connected to the distribution network 28, 36, to which the energy supply device 24, 32 which is assigned as a secondary source is connected.

In normal operation, it is provided that the first braking devices 12, 14 obtain the energy necessary for their operation from their primary source, i.e. from the first energy supply device 24. Likewise, the second braking devices 18, 20 obtain the energy necessary for their operation from the primary energy supply device assigned to them, i.e. from the second energy supply device 32. This is used to provide redundancy between the braking devices 12, 14, 18, 20. If, for example, the second energy supply device 32 fails, and thus the second braking devices 18, 20 are no longer functional, then the vehicle can still be braked by means of the first braking devices 12, 14, which obtain their energy from the still functioning first energy supply device 24. The vehicle thus remains controllable even in the event of a failure or malfunction of only one of the energy supply devices 24, 32.

In order to increase a possible braking effect in the event of a failure of one of the energy supply devices 24, 32, the braking devices 12, 14, 18, 20 may use energy from the secondary source assigned to them for their operation in the event of a failure of their primary source. For this purpose, the braking devices 12, 14, 18 and 20 each have a control device which is set up to detect a failure and/or malfunction of the energy supply device 24, 32 assigned as the primary source and, if a failure and/or malfunction is detected of the energy supply device assigned as the primary source 24, 32, to switch the energy supply device used from the primary source to the energy supply device 24, 32 which is assigned as the secondary source. As a result, in addition to the braking effect of the braking devices 12, 14, 18, 20, the primary source of which does not fail and/or malfunction, a braking effect of the other braking devices 12, 14, 18, 20 can be provided.

In another embodiment, the control device may be set up to limit a power taken from the secondary source. This is particularly advantageous when the power that can be provided by the energy supply devices 24, 32 is not sufficient to operate all braking devices 12, 14, 18, 20 at the same time. The power limitation achieves the maximum braking effect that can be achieved with an energy supply device 24, 32.

In other embodiments, in which there are additional energy supply devices, for example one of the other energy supply devices can also be assigned as a secondary source.

Figure 2:
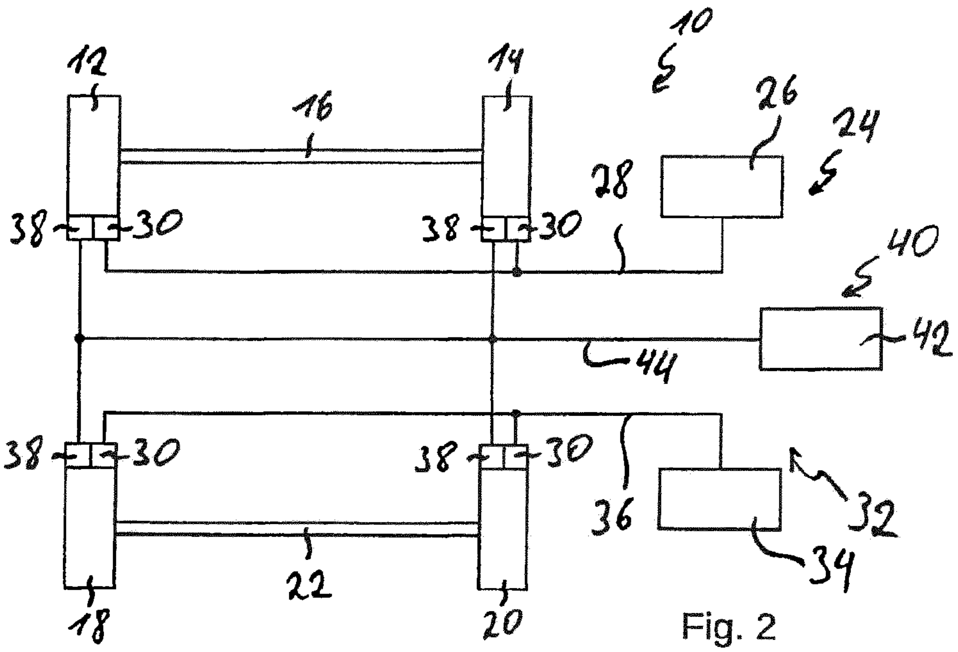
FIG. 2 is a schematic representation of a braking system according to an embodiment of the invention.

An example of such an embodiment is shown in FIG. 2. The first energy supply device 24 has only connections to the primary inputs 30 of the first braking devices 12,14. The second energy supply device 32 has only connections to the primary inputs 30 of the second braking devices 18.20.

A third energy supply device 40 has a third energy storage facility 42 and a third distribution network 44. The third energy supply device 40 is connected to the secondary inputs 38 of the braking devices 12, 14, 18, 20. In addition, the third energy supply device 40 is assigned to the braking devices 12, 14, 18, 20 as a secondary source. In the event that one of the energy supply devices 24, 32 malfunctions or fails, the energy provided by the third energy supply device 40 is available for carrying out braking processes.

For example, this energy provided by the third energy supply device 40 may be limited in its available power. However, even this limited power can be used, for example, to generate a braking effect, which, for example in combination with the functioning braking systems, 212, 14, 18, 20, is sufficient to meet appropriate safety standards, for example.

In other embodiments, the third energy supply device 40 has, for example, a control device for controlling the braking effect of the braking devices 12, 14, 18, 20. In addition, the third distribution network 44 has, for example, signal lines for transmitting control signals from the control device to the braking devices 12, 14, 18, 20, for example a CAN bus. The power available via the third distribution network 44 may be limited.

Therefore, for example, secondary input 38 is set up to receive power that is less than the power that the primary input 30 is set up to receive. For example, the secondary input 38 has a power limiting device so as not to overload the third distribution network 44. This can be particularly important if the lines and plugs used to connect the third distribution network 44 are dimensioned for the respective transportable power and could be damaged or destroyed if the power transported were too high.

Figure 3:
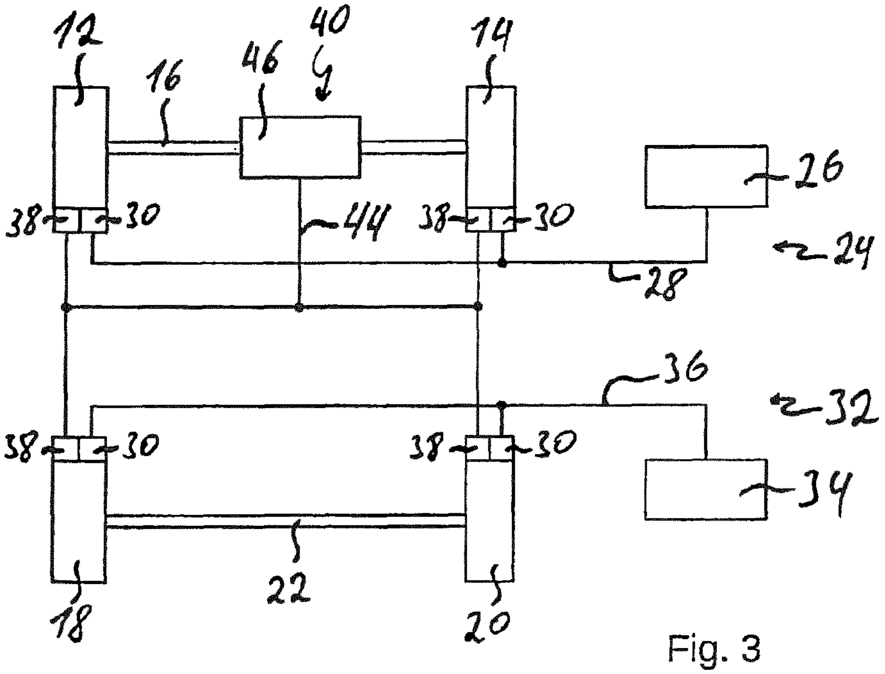
FIG. 3 is a schematic representation of a braking system according to an embodiment of the invention.

In a further embodiment as shown in FIG. 3, the third energy supply device 40 may have a recuperation device 46 instead of an energy storage device 42. The recuperation device 46 is suitable for generating electrical energy from a rotational movement of an axle 16, 22, which is passed on to the secondary inputs 38 via the third distribution network 44. As a result, in the event of failure of the first or second energy supply device 24, 32 there is additionally a braking effect owing to the recuperation.

Figure 4:
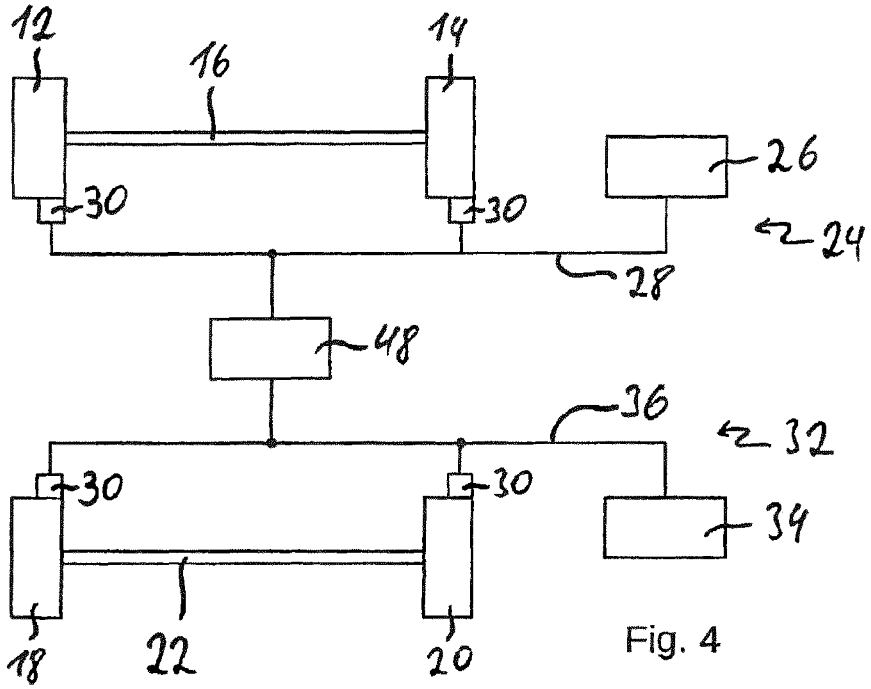
FIG. 4 is a schematic representation of a braking system according to an embodiment of the invention.

In other embodiments, one of which is shown as an example in FIG. 4, the braking devices '12, 14, 18, 20 have no secondary inputs 38. Instead, a controllable energy control device 48 is provided, which is connected to the distribution networks 28, 36. The energy control device 48 is designed and set up to detect a malfunction and/or failure of the energy supply via one of the distribution networks 28, 36. In addition, the energy control device 48 is designed and set up, for example in the event of a malfunction of the energy supply devices 24, 32 connected to one of the distribution networks 28, 36, to direct energy from the other distribution network 28, 36 to the distribution network 28, 36 with the malfunctioning energy supply device 24, 32.

In other embodiments, the energy control device 48 is designed and set up to limit the power conducted into the distribution network 28, 36 to which the malfunctioning energy supply device 24, 32 is connected.

In other embodiments, the third energy supply device 40 is connected to the energy control device 48 by means of the third distribution network 44, so that in the event of a malfunction of one of the energy supply devices 24, 32 this can direct energy from the third energy supply device 40 into the distribution network 28, 36 with the malfunctioning energy supply device 24, 36. For example, the third energy supply device 40 is assigned to all braking devices 12, 14, 18, 20 as a secondary source.

In other embodiments, for example, the third energy supply device 40 is provided as another element in the vehicle, in particular of the electromechanical braking system, such as a foot brake module, E compressor or another element from another on-board electrical system or its power supply, in particular the 24 V on-board electrical system.

In other embodiments, only some of the braking devices 12, 14, 18, 20 are assigned a secondary source. For example, the braking devices 12, 14 which are arranged on a front axle 16 of the vehicle can be provided with an assigned secondary source and the braking devices 18, 20 which are arranged on a rear axle 22 of the vehicle do not have a secondary source available. The function of the brakes of the front axle 16 is particularly important in the event of a malfunction of an energy supply device 24, 32, since the front axle 16 experiences an increase in axle load during braking.

In other embodiments, all braking devices 12, 14, 18, 20 arranged together on an axle 16, 22 are designed either with or without a secondary source. For example, the first braking devices 12, 14 on the front axle 16 are designed either both with or both without a secondary source, wherein the second energy supply device 32 can be assigned to them as a secondary source, for example. This is particularly advantageous for avoiding a yaw torque due to an uneven braking process.

In other embodiments, instead of the braking devices, 12, 14, 18, 20 other actuators may be provided, for example.

In other embodiments, the energy control device 48 is formed by a control unit, for example a control unit of an EMBS system.

In other embodiments, for example, the secondary inputs 38 have a control device for controlling an energy take-up of the braking device 12, 14, 18, 20, which avoids an overload of the secondary source. In other embodiments, for example, the braking device 12, 14, 18, 20 has a controllable selection device for selecting one of the energy supply devices 24, 32, 40 connected to it. Such a controllable selection device may be set up, for example, in the event of a malfunction of the energy supply device 24, 32, 40 connected to a primary power receiver, such as the primary input 30, to select energy from the energy supply device 24, 32, 40 connected to a secondary energy absorption device, for example to the secondary input 38, for use in the braking device.

The energy supply devices 24, 32 and 40 are shown here only schematically. When using an energy storage device 26, 34, 42 which, for example, can be designed as a battery, in particular as a lithium-ion battery, the energy supply devices 24, 32, 40 may have other devices, such as a charging and/or discharging current controller, or a temperature monitoring device. Each of the energy supply devices 24, 32, 40, regardless of the assignment thereof as a primary or secondary source, may also be designed in any suitable different way, for example as a battery or fuel cell.

In particular, utility vehicles may have multiple front and/or rear axles 16, 22 in other embodiments, for example in a 6×2 or 6×4 arrangement. In these cases, braking devices 12, 14, 18, 20 may be arranged on multiple front axles 16 and/or on multiple rear axles 22.

A malfunction of the respective distribution network 28, 36, 44 is equivalent to a malfunction of the connected energy supply device 24, 32, 40 from the point of view of the braking device 12, 14, 18, 20. Such a malfunction of a distribution network 28, 36, 44 is often even indistinguishable from a malfunction of the energy supply device 24, 32, 40 from the point of view of the braking device. Such a distinction is not relevant to the function, since the essential indication of a malfunction within the meaning of this invention is that there is insufficient energy available to operate the braking device 12, 14, 18, 20. A malfunction of the energy supply device 24, 32, 40 is therefore to be understood as any malfunction that leads to an insufficient power supply to one of the braking devices 12, 14, 18, 20.

The designation first braking device 12, 14 is to be understood as meaning that the braking devices 12, 14 so designated are assigned to a first group of braking devices. Similarly, the designation second braking devices 18 and 20 is to be understood as meaning that the braking devices 18 and 20 referred to in this way are assigned to a second group of braking devices. In other embodiments, for example, each of the groups can be assigned fewer than two or more than two braking devices 12, 14, 18, 20. In other embodiments, the braking devices 12, 14, 18, 20 can each be constructed and/or designed identically or differently, for example.

REFERENCE SIGN LIST

10 (electromechanical) braking system
12 first (electromechanical) braking device/first actuator
14 first (electromechanical) braking device/first actuator
16 first axle (front axle)
18 second (electromechanical) braking device/second actuator
20 second (electromechanical) braking device/second actuator
22 second axle (rear axle)
24 first energy supply device
26 first energy storage device
28 first distribution network
30 primary input
32 second energy supply device
34 second energy storage device
36 second distribution network
38 secondary input
40 third energy supply device
42 third energy storage device
44 third distribution network
46 recuperation device
48 energy control device (control device)

The invention claimed is:

1. An electromechanical braking system for a vehicle, comprising:
at least one first actuator;
at least one first energy supply device; and
one second energy supply device, wherein
one of the energy supply devices is assigned to the first actuator as a primary source for supplying electrical energy, and the first actuator has a connection to the one energy supply device assigned as the primary source, and
the first actuator also has a connection to an energy supply device assigned to it as a secondary source for supplying the first actuator with electrical energy;
at least one second actuator to which one of the energy supply devices is assigned as the primary source for supplying electrical energy, wherein
the second actuator has a connection to the energy supply device assigned as the primary source, the second actuator is additionally connected to an energy supply device assigned to it as a secondary source for supplying the first actuator with electrical energy, and one of the connections between one of the first and second actuators and the energy supply device assigned to it as a secondary source has a connection between a distribution network connected to the primary source and a distribution network connected to the secondary source.

2. The electromechanical braking system according to claim 1, wherein at least one of the first and second actuators is assigned one of the energy supply devices as a secondary source that is not assigned to it as a primary source.

3. The electromechanical braking system according to claim 1, wherein at least one of the first and second actuators has a primary energy absorption device and a secondary energy absorption device, each for connection to an energy supply device.

4. The electromechanical braking system according to claim 3, wherein at least one of the energy absorption devices has a signal input for receiving a control signal for controlling the actuator.

5. The electromechanical braking system according to claim 4, wherein the energy absorption device having the signal input is set up to receive power that is less than the power that the other energy absorption device is set up to receive.

6. The electromechanical braking system according to claim 1, wherein at least one of the first and second actuators is assigned a recuperation device as a secondary source.

7. The electromechanical braking system according to claim 1, wherein at least one of the first and second actuators is assigned a third energy supply device as a secondary source.

8. The electromechanical braking system according to claim 1, wherein one of the connections between one of the first and second actuators and the energy supply device assigned to it as a secondary source has a direct electrical connection.

9. The electromechanical braking system according to claim 1, wherein one of the connections between one of the first and second actuators and the energy supply device assigned to it as a secondary source has a control device for controlling and/or regulating an energy flow between the secondary source and the actuator.

10. The electromechanical braking system according to claim 1, wherein the first actuators are arranged on at least one front axle of the vehicle, wherein the first actuators are assigned the first energy supply device as the primary source, and the second actuators are arranged on at least one rear axle of the vehicle, wherein the second actuators are assigned the second energy supply device as the primary source.

11. The electromechanical braking system according to claim 1, further comprising:

a control device for controlling energy consumption of braking devices and/or for controlling a braking force of braking devices of the braking system.

12. A vehicle comprising an electromechanical braking system according to claim 1.

13. The vehicle according to claim 12, wherein the vehicle has an electric drive.

14. The vehicle according to claim 13, wherein the vehicle has a traction battery and/or a fuel cell.

15. A trailer for a utility vehicle, the trailer comprising an electromechanical braking system according to claim 1.

16. A utility vehicle combination comprising:

a vehicle according to claim 12; and at least one trailer coupled to the vehicle.

17. An electromechanical braking actuator for an electromechanical braking system, comprising:

a primary energy absorption device;

a secondary energy absorption device, each of the primary and secondary energy absorption devices being connected to an energy supply device; and a controllable selection device for selecting one energy supply device for supplying the actuator with electrical energy.

18. The actuator according to claim 17, wherein the controllable selection device is configured, in an event of a malfunction of the energy supply device connected to the primary energy absorption device, to select energy from the energy supply device connected to the secondary energy absorption device for use by the actuator.

* * * * *